(12) United States Patent
Albu et al.

(10) Patent No.: US 8,707,150 B2
(45) Date of Patent: Apr. 22, 2014

(54) APPLYING EFFECTS TO A VIDEO IN-PLACE IN A DOCUMENT

(75) Inventors: Voicu Anton Albu, Redmond, WA (US); Robert Emmett Kolba, Jr., Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 502 days.

(21) Appl. No.: 12/339,068

(22) Filed: Dec. 19, 2008

(65) Prior Publication Data

US 2010/0162092 A1 Jun. 24, 2010

(51) Int. Cl.
*G06F 3/00* (2006.01)
(52) U.S. Cl.
USPC .......................................................... 715/201
(58) Field of Classification Search
USPC ........................... 715/200, 201, 716, 719, 720
See application file for complete search history.

(56) References Cited

U.S. PATENT DOCUMENTS

| | | | | |
|---|---|---|---|---|
| 6,208,347 | B1 * | 3/2001 | Migdal et al. | 345/419 |
| 7,203,942 | B2 * | 4/2007 | Lafruit et al. | 718/100 |
| 7,286,132 | B2 * | 10/2007 | Kuhne | 345/501 |
| 7,337,403 | B2 | 2/2008 | Pavley et al. | |
| 7,632,936 | B2 * | 12/2009 | Mirkov et al. | 536/23.6 |
| 7,685,255 | B2 * | 3/2010 | Amlekar et al. | 709/217 |
| 7,920,144 | B2 * | 4/2011 | Vogt et al. | 345/475 |
| 2003/0085888 | A1 * | 5/2003 | Lafruit | 345/419 |
| 2003/0160785 | A1 * | 8/2003 | Baumberg | 345/419 |
| 2004/0169671 | A1 * | 9/2004 | Aronson et al. | 345/700 |
| 2005/0251731 | A1 * | 11/2005 | Valderas et al. | 715/500 |
| 2006/0119599 | A1 * | 6/2006 | Woodbury | 345/420 |
| 2006/0161572 | A1 * | 7/2006 | Vogt et al. | 707/101 |
| 2006/0184980 | A1 | 8/2006 | Cole | |
| 2006/0251384 | A1 * | 11/2006 | Vronay et al. | 386/52 |
| 2007/0044017 | A1 | 2/2007 | Zhu et al. | |
| 2007/0057964 | A1 * | 3/2007 | Anthony et al. | 345/619 |
| 2007/0189708 | A1 | 8/2007 | Lerman et al. | |
| 2007/0220523 | A1 * | 9/2007 | LaFruit et al. | 718/104 |
| 2007/0234214 | A1 * | 10/2007 | Lovejoy et al. | 715/719 |
| 2007/0250601 | A1 * | 10/2007 | Amlekar et al. | 709/219 |
| 2008/0163317 | A1 * | 7/2008 | Mills | 725/109 |

(Continued)

OTHER PUBLICATIONS

Huang, Yi-Chin et al. "Design and Implementation of an Efficient MPEG-4 Interactive Terminal on Embedded Devices." 2004 IEEE International Conference on Multimedia and Expo (ICME). pp. 715-718.*

(Continued)

*Primary Examiner* — Kyle Stork
(74) *Attorney, Agent, or Firm* — Jim Ross; Micky Minhas

(57) ABSTRACT

An application program utilizes a decoding sub-system and a three-dimensional (3D) rendering sub-system to apply effects to a video in-place in a document. The program configures pixel shaders for use with a rendering device for applying pixel-level effects to the decoded frames of the video, generates meshes, and pre-renders textures for use in implementing effects. When a request is received to play back the video in-place in the document, a decoding surface and a rendering surface are allocated. The decoding sub-system decodes frames of the video and copies the decoded frames to the decoding surface on one thread. A separate thread copies decoded frames from the decoding surface to a texture and from the texture to the rendering surface. The rendering device utilizes the pixel shaders, meshes, pre-computed textures, and other data to render the frames of the video to a rendering target.

12 Claims, 8 Drawing Sheets

(56) References Cited

U.S. PATENT DOCUMENTS

| | | | | |
|---|---|---|---|---|
| 2008/0246759 A1* | 10/2008 | Summers | | 345/420 |
| 2008/0284777 A1* | 11/2008 | Altieri | | 345/418 |
| 2009/0174717 A1* | 7/2009 | Salisbury et al. | | 345/473 |
| 2009/0187825 A1* | 7/2009 | Sandquist et al. | | 715/719 |
| 2009/0276859 A1* | 11/2009 | Ojanen | | 726/27 |
| 2010/0083170 A1* | 4/2010 | Lim et al. | | 715/810 |
| 2010/0114857 A1* | 5/2010 | Edwards et al. | | 707/709 |

OTHER PUBLICATIONS

"YouTube" <available from: http://web.archive.org/web/2007042802533/http://www.youtube.com/watch.php?v=Xf-VfutSyRA>, Apr. 28, 2007, pp. 1-4.*

"Video Edit Magic v4.47", Retrieved at<<http://www.deskshare.com/Resources/articles/vem_InsertingVideos_inPowerPoint.aspx>>, Oct. 16, 2008, pp. 1-2.

"Final Cut Pro 6. Incredible Real-Time Effects.", Retrieved at<<http://www.apple.com/finalcutstudio/finalcutpro/effects.html>>, Oct. 16, 2008, pp. 1-3.

Bunzel Tom, "Editing Video in PowerPoint (and a Lot More)", Retrieved at<<http://www.informit.com/guides/content.aspx?g=msoffice&seqNum=244>>, Oct. 16, 2008, pp. 1-3.

Chemmanoor Thomson,"How to use Audio and Video on PowerPoint Presentations?", Retrieved at<<http://www.e-topic.com/articles/175/1/How-to-use-Audio-and-Video-on-PowerPoint-presentations/Page1.html>>, Jan. 3, 2007, pp. 1-2.

Rubinstein Herb, "Presenting Video in PowerPoint Presentations", Retrieved at<<http://www.indezine.com/ideas/presentingvideo.html>>, Dec. 30, 2004, pp. 1-2.

* cited by examiner

APPLYING EFFECTS TO A VIDEO IN-PLACE IN A DOCUMENT

BACKGROUND

Many types of application programs, like presentation application programs for instance, allow users to modify different properties of shapes, text, and other objects contained in a document. For instance, modification of these properties might allow a user to customize the color of a shape, the type of border that is applied to the shape, or the manner in which the shape is cropped. Some application programs even allow multiple properties to be specified and grouped together to form a theme. The properties specified in the theme can then be applied to all of the objects in a document together in order to change properties of the objects in a consistent way and to create a coherent visual appearance across all of the objects in the document.

While many application programs allow themes to be applied to text and shapes, for instance, these application programs typically do not allow themes to be applied to videos. In order to create a document in which a video and other document objects have consistent visual properties, a user must typically utilize a dedicated video editing program to modify the desired properties of a video by applying effects to the video and to pre-render the video. Once the video has been pre-rendered with the desired effects, the video can be embedded into the document that is being created. If the video is unsatisfactory for some reason, this process must be repeated until a satisfactory result is achieved. Because a dedicated video editing program must be utilized to pre-render the desired video effects, creation of a document that includes a video and other objects to which one or more properties are to be applied can be a frustrating and time consuming process.

It is with respect to these considerations and others that the disclosure made herein is presented.

SUMMARY

Technologies are described herein for dynamically applying real-time effects to a video in-place in a document. In particular, through an implementation of the concepts and technologies presented herein, one or more properties can be consistently set on all of the objects in a document, including videos. In order to apply properties to a video, effects are applied to the video dynamically, in real-time, and while the video is in-place in the document, thereby negating the need for an external video editing program for pre-rendering the effects.

According to one embodiment presented herein, an application program is configured to create a document containing a video. Other objects might also be contained in the document, like shapes and text. Properties can be set on any of the objects, including the video, to modify the color, geometry, borders, shape, and other properties of the objects, and to apply reflection and other types of effects to the objects. In one implementation, the application program is a presentation application configured to create a presentation document with the objects contained therein and to apply effects to one or more videos in the manner presented herein. The effects might include a cropping effect, a reflection effect, a border effect, or another type of visual effect.

In order to apply effects to a video in-place in the document, the application program utilizes a decoding sub-system and a three-dimensional ("3D") rendering sub-system. In particular, the application program configures the decoding sub-system to decode frames of the video and configures a rendering device to render the decoded frames as textures on a 3D shape. The application program also configures the rendering device to apply the desired effects to decoded frames of the video on a frame-by-frame basis.

In order to configure the 3D rendering sub-system, the application program may configure one or more pixel shaders for use with a rendering device for applying pixel-level effects to the decoded frames of the video, such as color effects. Meshes and textures might be pre-rendered for use in implementing certain effects. In one embodiment, the pixel shaders, meshes, and pre-rendered textures are generated prior to playback of the video.

When a request is received to play back the video in-place in the document, a rendering device is obtained for rendering the frames of the video. The rendering device is acquired and a decoding surface and a rendering surface are allocated. Once the decoding surface and the rendering surface have been allocated, the rendering device is released. An appropriate locking mechanism, such as a mutual exclusion algorithm (a "mutex"), may be utilized to ensure that multiple threads do not simultaneously access the rendering device.

The decoding sub-system decodes frames of the video and copies the decoded frames to the decoding surface on one thread, acquiring and releasing the decoding surface as necessary. A separate thread copies decoded frames from the decoding surface to a texture and from the texture to the rendering surface. The second thread may also utilize an appropriate locking algorithm when accessing the decoding surface.

In order to render a decoded frame, the rendering device utilizes the pixel shaders, meshes, pre-computed textures, and other data to render the frames with the desired video effects. In this way, the rendering device renders the video with the effects applied dynamically, in real-time, and while the video is in-place in the document.

According to one implementation, the application program is further configured to apply animations to the objects in the document, including the video. For instance, an animation may be created that modifies the three-dimensional geometry of a video object. Because the embodiments presented herein render the video object on a frame-by-frame basis, taking into account the current geometry of the video, the animation can be applied to the video in real-time while it is being played back in the manner presented herein.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
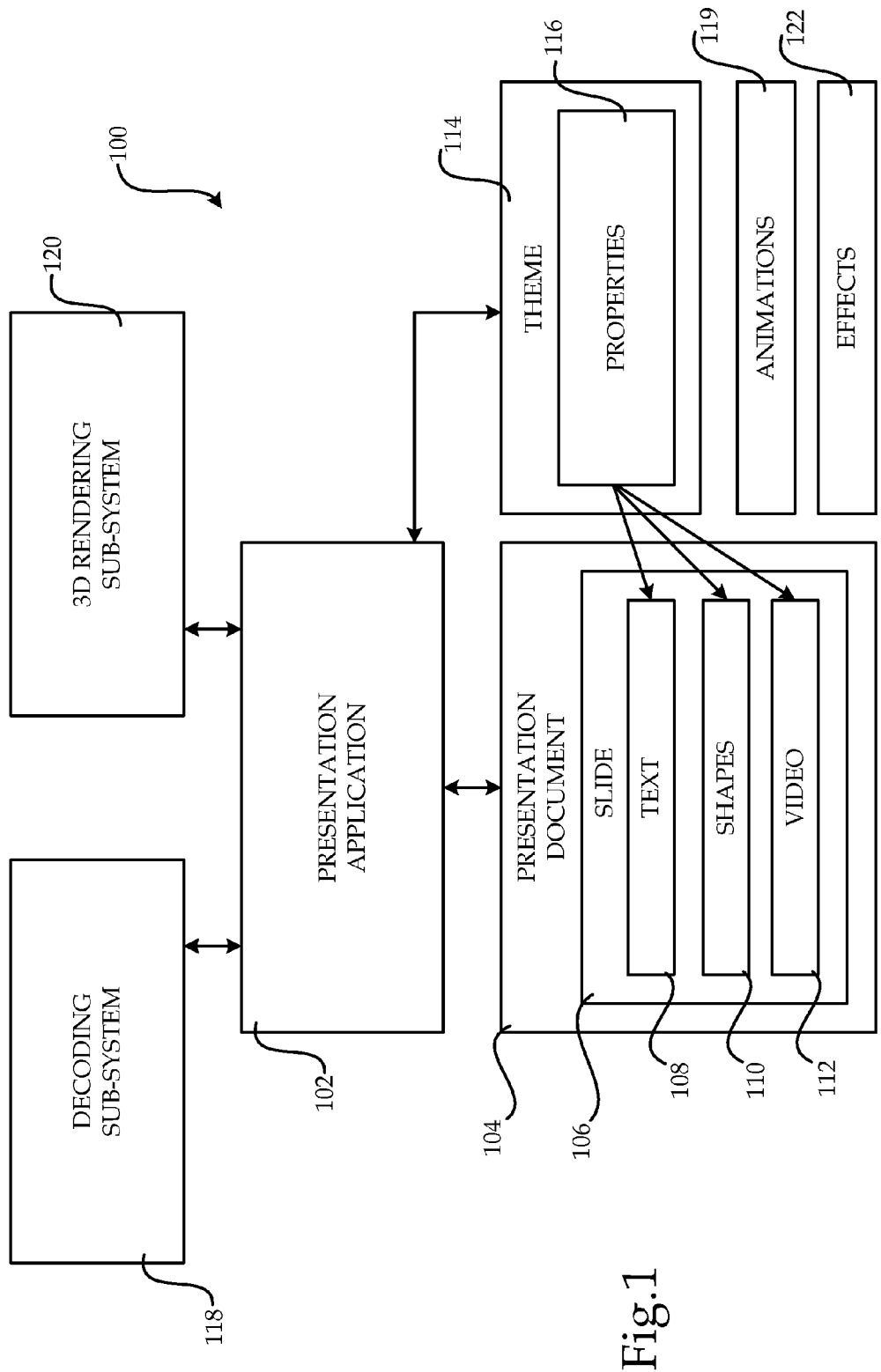
FIG. 1 is a software architecture diagram showing aspects of an illustrative operating environment for the embodiments presented herein.

The following detailed description is directed to technologies for applying effects to a video in-place in a document. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements throughout the several figures, aspects of a computing system and methodology for applying effects to a video in-place in a document will be described.

Turning now to FIG. 1, an illustrative system 100 will be described that forms an operating environment for several embodiments presented herein. According to one embodiment, the system 100 includes a presentation application 102 that is configured to create and store a presentation document 104. As illustrated in FIG. 1, the presentation document 104 may include one or more slides, such as the slide 106, upon which text 108, shapes 110 and a video 112 may be placed. Other types of objects may also be placed on the slide 106 and treated in the manner described herein.

According to embodiments, the presentation application 102 provides functionality for allowing a user to set one or more properties 116 on the text 108, shapes 110, and video 112. For instance, modification of the properties 116 might allow a user to customize the color of the shape 110, the type of border that is applied to the shape 110, or the manner in which the shape 110 is cropped.

In one implementation, the presentation application 102 allows multiple properties 116 to be specified and grouped together as a theme 114. The properties 116 specified in a theme 114 can be applied to multiple objects in the slide 106 simultaneously. In this way, the visual appearance of multiple objects can be modified in a consistent way to create a coherent visual appearance across all of the objects in the document 104. It should be appreciated that many different types of properties 116 may be specified on the text 108, shapes 110, video 112, and other types of objects that might be inserted onto a slide 106.

Through modification of the properties 116, various effects 122 may be applied to the text 108, shapes 110 and video 112. For instance, the effects 122 might include color effects, such as recolor, grayscale, black and white, and brightness and contrast modification. A recolor effect consists of replacing the color of each pixel with a linear interpolation between two fixed colors based on the luminance of the original pixel. The grayscale color effect is a recolor effect where the base colors are black and white. The black and white color effect consists of a color selection from two colors based on a comparison of the luminescence of an original pixel with a given threshold. The brightness and contrast color effect is a linear color transform, applied to each channel, in order to change the luminescence of each pixel. It should be appreciated that other types of color effects might be provided by the presentation application 102.

According to other implementations, the effects 122 may include a cropping effect for selecting a rectangular or other-shaped region from an original image to be used as a texture of an object. A border effect might also be applied that allows the specification of various parameters for rendering the edges of an object. For instance, the width, pattern, style, color, joints, and line endings may be specified variously to provide different types of borders for an object. A soft edges effect may also be provided that includes a gradient transparency oriented toward the edges of an object. A reflection effect is also provided in one embodiment that generates a reflection of one or more of the objects on the slide 106. It should be appreciated that many more types of effects 122 may be provided by the presentation application 102 in embodiments.

According to one implementation, the presentation application 102 also provides functionality for allowing a user to define one or more animations 119. The animations 119 can be utilized to animate the text 108, shapes 110, and video 112 on the slide 106. For instance, an animation may be specified for causing the text 108 to move along a motion path when displayed by the presentation application 102. Other types of animations may be provided that include motion, 2-dimensional or 3-dimensional rotation, and 2-dimensional and 3-dimensional transformations. Other types of animations 119 may also be provided by the presentation application 102 according to embodiments.

As described briefly above, previous presentation applications provided limited functionality for applying a theme 114 to a video 112. As a result, a user typically must utilize an external video editing application to apply effects to a video 112. Once the effects have been applied to the video 112 and pre-rendered, the new video may be imported into the presentation document 104. This, however, can be a frustrating and time consuming process. In order to address this shortcoming of previous presentation applications, the embodiments presented herein allow the effects 122 to be applied to a video 112 while in-place in a presentation document 104. In this manner, the properties 116 set forth in the theme 114 can be applied to all of the objects on a slide 106, including a video 112. For instance, if a theme 114 modifies a property of all of the objects on a slide 106 to change their color, the theme can be correctly applied to a video 112 to modify its color during playback in real-time while in-place in the document 104. Additional details regarding this process will be provided below with respect to FIGS. 2-5.

As will be described in greater detail below, the presentation application 102 utilizes services provided by a decoding sub-system 118 and a 3D rendering sub-system 120 in order to apply the effects 122 to the video 112 while in-place in the presentation document 104. As will be discussed in greater detail below, the decoding sub-system 118 provides functionality for decoding the individual frames of the video 112. In one embodiment, the decoding sub-system 118 comprises the DIRECT SHOW decoding sub-system from MICROSOFT CORPORATION of Redmond, Wash.

As will be described in greater detail below, the 3D rendering sub-system 120 provides functionality for rendering 3D objects in a scene. As will be discussed in greater detail below, the individual frames of the video 112 are decoded by the decoding sub-system 118. The desired effects 122 are then applied to the decoded frames individually by the 3D rendering sub-system 120. Once the desired effects 122 have been applied to the individual frames of the video 112, the 3D rendering sub-system 120 displays the video 112 in-place in the presentation document 104.

It should be appreciated that, in one embodiment, the application of the effects 122 to the video 112 by the 3D rendering sub-system 120 is done in real-time or in near real-time. In order to improve performance of the 3D rendering sub-system 120, a hardware accelerated display adaptor may be used. It should be appreciated, however, that the rendering performed by the 3D rendering sub-system is not dependent upon the presence of an accelerated graphics hardware device and may be performed by a general purpose central processing unit.

According to one embodiment, the 3D rendering sub-system 120 comprises the DIRECT X 3D rendering sub-system 120, also from MICROSOFT CORPORATION. It should be appreciated, however, that other types of decoding sub-systems and 3D rendering sub-systems from other developers may be utilized. For instance, the OPEN GL rendering sub-system may also be utilized in various embodiments. Additional details regarding the operation of the presentation application 102, the decoding sub-system 118, and the 3D rendering sub-system 120 for applying the effects 122 to a video 112 in-place in a document 104 will be described in detail below with respect to FIGS. 2-5.

It should be appreciated that while the embodiments presented herein are described in the context of a presentation application 102 playing back a video 112 on a slide 106 of a presentation document 104, the embodiments presented herein are not limited for use with a presentation application. Rather, the embodiments presented herein for playing back a video in-place in a document may be utilized with any type of application program that allows a video to be inserted into a document and played back. For instance, the embodiments presented herein may be utilized with a word processing application program, a spreadsheet application program, a page layout and design program, a diagramming application program, and others.

Figure 2:
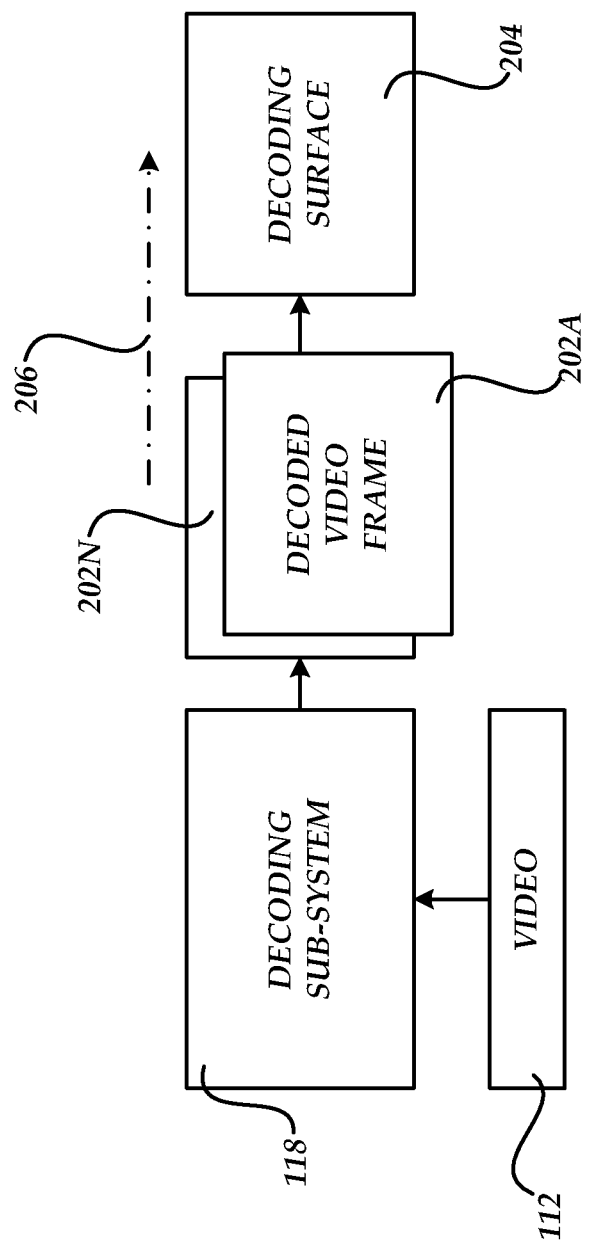
FIGS. 2-3 are software architecture diagrams showing aspects of several embodiments provided herein for applying effects to a video in-place in a document.

Referring now to FIG. 2, additional details will be provided regarding one embodiment presented herein for applying the effects 122 to the video 112 in-place in the document 104. According to one embodiment, the decoding sub-system 118 is configured to decode the frames of the video 112. In certain embodiments, the decoding sub-system 118 may be configured differently to decode video that has been encoded utilizing different encoders. The results of the decoding process performed by the decoding sub-system 118 are a sequence of decoded video frames 202A-202N. It should be appreciated that the decoding sub-system 118 may also decode an audio portion of the video 112.

As will be described in greater detail below, in order to utilize the 3D rendering sub-system 120 to apply the effects 122 to the video 112, a decoding surface 204 is allocated. In one embodiment, the decoding surface 204 comprises a portion of the main memory of a computing system. Alternately, the decoding surface 204 may comprise a portion of the memory of a dedicated graphics processing unit contained within a computing system that is executing the decoding sub-system 118.

In one implementation, a thread 206 is configured to acquire the decoding surface 204 in a manner that will prevent another thread from accessing the decoding surface 204. For instance, an appropriate locking mechanism, such as a mutex, may be utilized to obtain and lock the decoding surface 204. Once the thread 206 has obtained the decoding surface 204, a decoded frame 202A is copied to the decoding surface 204. Once the decoded video frame 202A has been copied to the decoding surface 204, the thread 206 releases the decoding surface 204 so that other threads may access the decoding surface 204. Once the decoding surface 204 has been released, a notification may be provided to another thread, described below, that retrieves the decoded video frame 202A from the decoding surface 204 and applies the decoded video frame 202A to a texture.

As will be described in greater detail below, the thread 206 copies decoded video frames to the decoding surface 204 while another separately executing thread copies the decoded video frames 202A from the decoding surface 204 to a texture for rendering. Because multiple threads are utilized to copy video frames to and from the decoding surface 204, the decoding process illustrated in FIG. 2 can operate independently of the rendering process illustrated in FIG. 3. It should be appreciated that the thread 206 continues executing in the manner described above, copying individual decoded video frames 202A-202N to the decoding surface 204, during playback of the video 112. If the end of the video 112 is reached or if a user requests that playback be stopped, the decoding sub-system 118 will stop decoding the video 112 and generating the decoded video frames 202A-202N.

Figure 3:
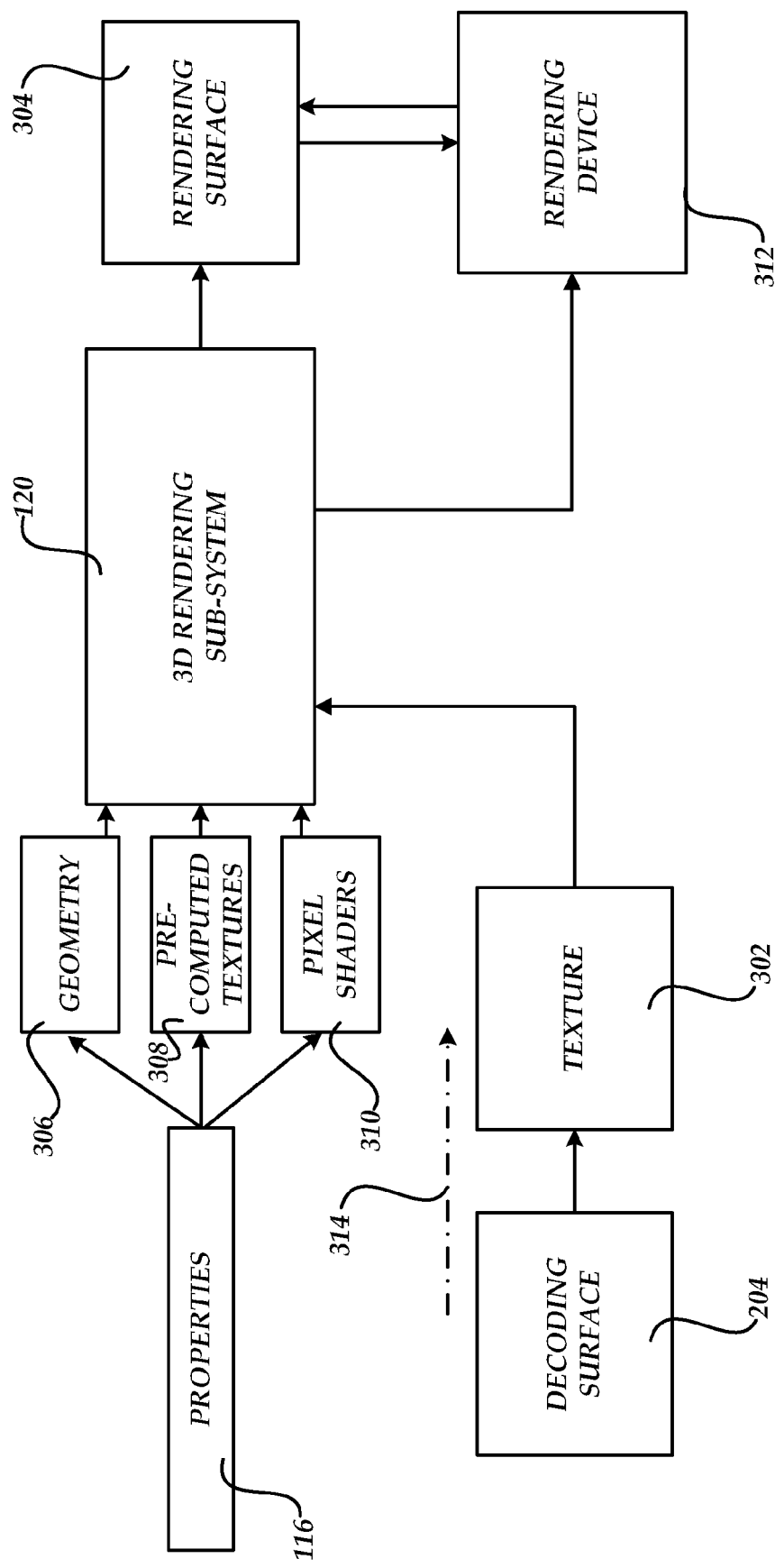

Referring now to FIG. 3, additional details will be provided regarding the application of the effects 122 to the decoded video frames 202A-202N. According to one embodiment, a number of data structures and other objects needed to apply the effects 122 to the frames of the video 112 in real-time are generated prior to playback of the video 112. For instance, as shown in FIG. 3, the properties 116 may be utilized to pre-compute the geometry 306, such as the pre-computation of one or more meshes for the video 112, to pre-compute one or more textures 308 and to generate one or more pixel shaders 310. As known in the art, a polygon mesh, referred to simply herein as a "mesh", is a collection of vertices, edges, and faces that together define the shape of a polyhedral object in 3D computer graphics. A texture is a bitmap image that can be applied to a surface. Texture mapping applies a texture to a surface. A pixel shader is a shader program, often executed on a graphics processing unit. A pixel shader adds 3D shading and lighting effects to pixels in an image. A pixel shader computes the color and attributes of each pixel. For instance, in the embodiments presented herein, the pixel shaders 310 may be utilized to render color effects.

Depending on the particular effects 122 to be applied, the geometry 306, pre-computed textures 308, and pixel shaders 310 may be generated differently. For instance, in one embodiment, the pixel shaders 310 are generated at the time the presentation application 102 is first executed. The pre-computed textures 308 may be pre-computed, for instance, when a reflection or border effect has been selected. As illustrated in FIG. 3, the geometry 306, pre-computed textures 308, and pixel shaders 310 are utilized by the 3D rendering sub-system 120 to render the frames of the video 112 onto a shape in a 3D scene.

As described above, the thread 206 is configured to copy the decoded video frames 202A-202N to the decoding surface 204 and to provide a notification when a decoded video frame has been copied. In response to receiving such a notification, a thread 314 acquires the decoding surface 204 and copies the decoded video frame 202A contained therein to a texture 302. The thread 314 then releases the decoding surface 204 so that the thread 206 may continue copying decoded video frames 202A-202N to the decoding surface 204. In this manner, the threads 206 and 314 synchronize access to the decoding surface 204 in a consistent and uninterrupted manner.

Once a decoded video frame 202 has been copied to the texture 302, a rendering device 312 acquires the rendering surface 304 and copies the texture 302 to the rendering surface 304. As with the decoding surface 204 described above, the rendering surface 304 may also comprise a portion of memory within the main memory of a computing system or within a graphics processing unit. The decoding surface 204 and the rendering surface 304 are allocated of a sufficient size to store individual frames of the video 112.

Once the rendering surface 304 has been acquired, the texture 302 is copied to the rendering surface 304. Once the texture 302 has been copied to the rendering surface 304, the rendering device 312 can be called with an instruction to render the texture 302 onto an appropriate shape. As discussed above, the geometry 306, pre-computed textures 308, and pixel shaders 310 may be utilized by the rendering device 312 to render the video frame with the effects 122 defined by the properties 116 applied thereto.

As shown in FIG. 3, the rendering device 312 renders the rendered frame. According to embodiments, the rendering device 312 may comprise a graphics processing unit emulator or may comprise an actual hardware video device. The hardware video device may include hardware for accelerating 3D graphics processing or may comprise a non-accelerated graphics device. It should be appreciated that the process described above with respect to FIG. 3 continues on a frame-by-frame basis to apply the effects 122 to each individual decoded frame 202 of the video 112 in real or near real-time.

As discussed briefly above, the presentation application 102 is configured to provide one or more animations 119. In one embodiment, the animations 119 may modify the geometry 306 of the video 112. Because the rendering device 312 renders individual frames 202 of the video 112 on a frame-by-frame basis, each frame of the video 112 can be rendered with the appropriate geometry 306 as modified by the animations 119. In this way, the video 112 can be played back with effects 122 even while it is being animated by the presentation application 102.

Referring now to FIGS. 4A-4D, additional details will be provided regarding the embodiments presented herein for applying effects to a video in-place in a document. In particular, FIGS. 4A-4D are flow diagrams illustrating aspects of the operation of the decoding sub-system 118, the presentation application 102, the 3D rendering sub-system 120, and the rendering device 312 in one embodiment herein.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 4A:
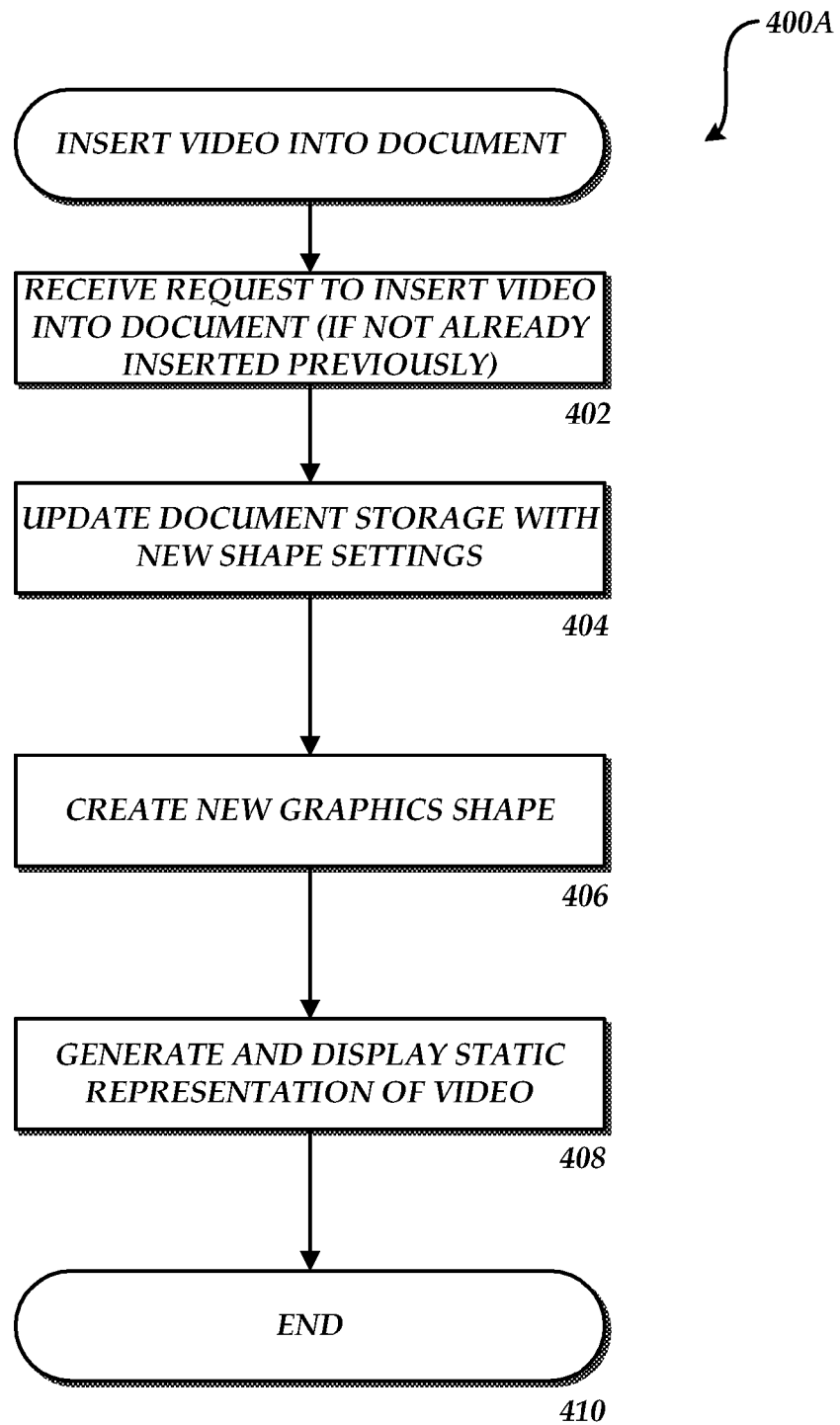
FIGS. 4A-4D are flow diagrams showing several illustrative routines illustrating aspects of one process provided herein for applying effects to a video in-place in a document.

The routine 400A shown in FIG. 4A illustrates one process for inserting the video 112 into the document 104 and for preparing to render the video 112. In particular, the routine 400A begins at operation 402, where the presentation application 102 receives a request to insert the video 112 into the document 104, if the video 112 has not been inserted previously. In response to receiving such a request, the routine 400A proceeds to operation 404, where storage utilized by the application 102 is updated with settings for a new shape for displaying the video 112.

From operation 404, the routine 400A proceeds to operation 406, where the presentation application 102 creates a new graphics shape for rendering by the 3D rendering sub-system 120. As discussed above, the frames of the video 112 are copied to a texture and the texture is rendered onto the graphics shape. Once the new graphics shape has been created at operation 406, the routine 400A proceeds to operation 408.

From operation 408, the routine 400A proceeds to operation 410, where the presentation application 102 generates and displays a static representation of the video 112. The static representation of the video 112 is a representation of the video 112 that is displayed when the video is not playing. It should be appreciated that pixel shaders 310, pre-computed textures 308, and geometry 306 may be utilized to generate the static representation. From operation 408, the routine 400A proceeds to operation 410, where it ends.

Figure 4B:
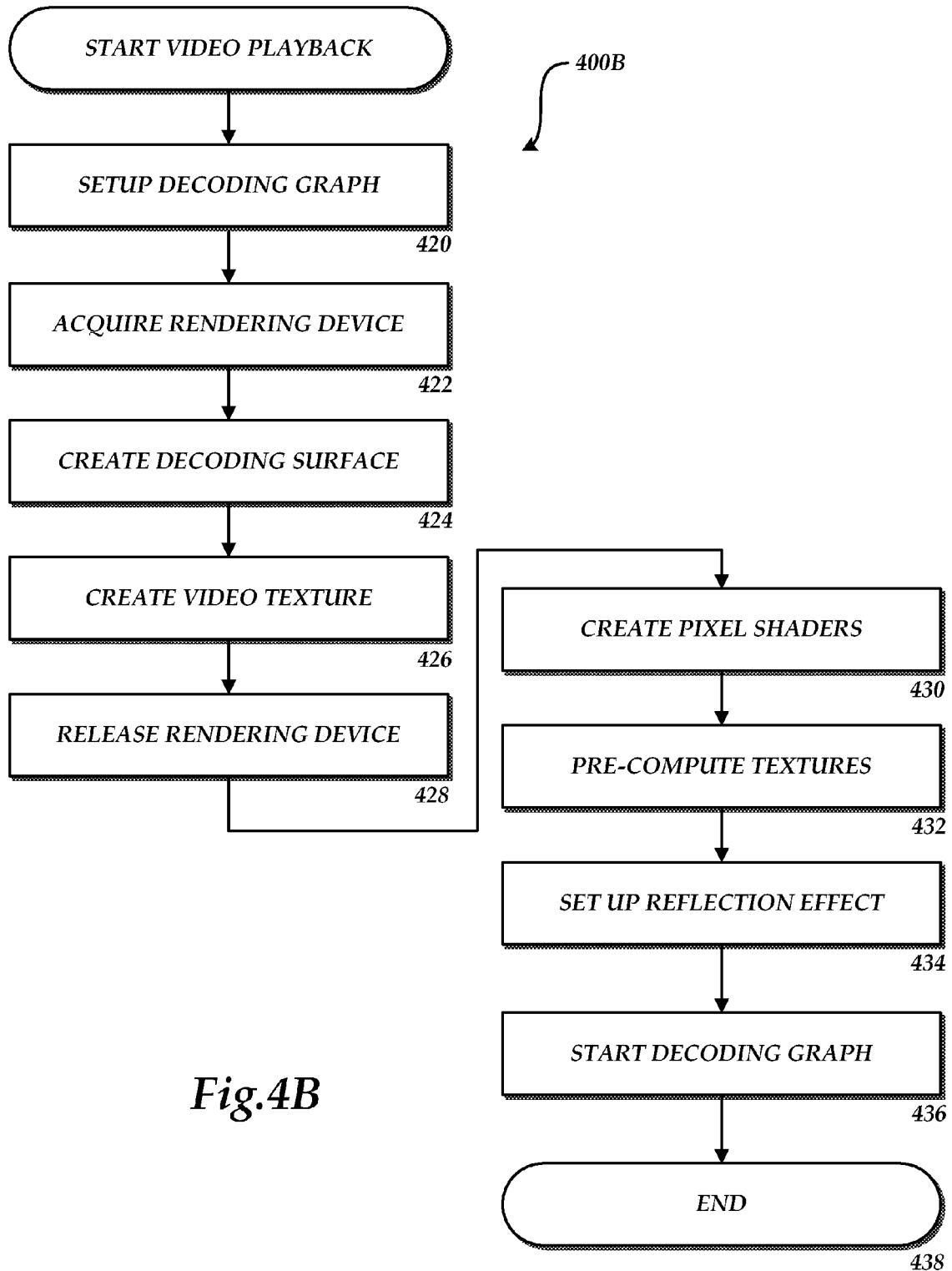

The routine 400B shown in FIG. 4B illustrates one process for starting playback of the video 112. It should be appreciated that the presentation application 102 might provide appropriate user interface controls for managing the playback of the video 112. For instance, appropriate start, stop and seek user interface controls may be provided by the presentation application 102 to allow a user to control playback of the video 112. The routine 400B is executed in response to a user selecting a user interface control for playing back the video 112 or in response to receiving another instruction for initiating playback of the video 112.

The routine 400B starts at operation 420 where a decoding graph is configured in order to set up the decoding sub-system 118. As discussed above, the decoding sub-system 118 is capable in embodiments of decoding many different types of video. Therefore, the presentation application 102 determines the type of video 112 that is being decoded and configures the decoding sub-system 118 appropriately. Once the decoding sub-system 118 has been configured, the routine 400 proceeds from operation 418 to operation 420 where the effects 122 to be applied to the video 112 are set on the graphics shape created above at operation 406.

Once the decoding sub-system 118 has been configured, the routine 400B proceeds to operation 422, where the rendering device 322 is acquired. An appropriate mutual exclusion mechanism may be utilized to acquire the rendering device 312 in a manner that prevents other threads from simultaneously accessing the rendering device 312.

Once the rendering device 312 has been acquired, the routine 400B proceeds to operation 424, where the decoding surface 204 is created on the rendering device 312. As discussed above, the decoding surface 204 comprises a portion of memory large enough to hold decoded frames of the video 112. Once the decoding surface 204 has been created at operation 424, the texture 302 is created at operation 426. After the decoding surface 204 has been created, the rendering device 312 is released at operation 428.

From operation 428, the routine 400B proceeds to operation 430, where the pixel shaders 310 are created. As discussed above, the pixel shaders 310 are utilized to implement color effects applied to the frames of the video 112. As also discussed above, the presentation application 102 may create pixel shaders 310 for the available color effects at the time it is first launched. Once the pixel shaders 310 have been created, the routine 400B proceeds to operation 432, where the pre-computed textures 308 are generated. As discussed above, certain types of effects 122 may utilize the pre-computed textures 308.

If a reflection effect has been selected for use with the video 112, the pre-computed textures 308 may be generated for the reflection effect. This occurs at operation 434. From operation 434, the routine 400B proceeds to operation 436 where the decoding sub-system 118 begins decoding the frames of the video 112. The routine 400B then proceeds to operation 438, where it ends.

Figure 4C:
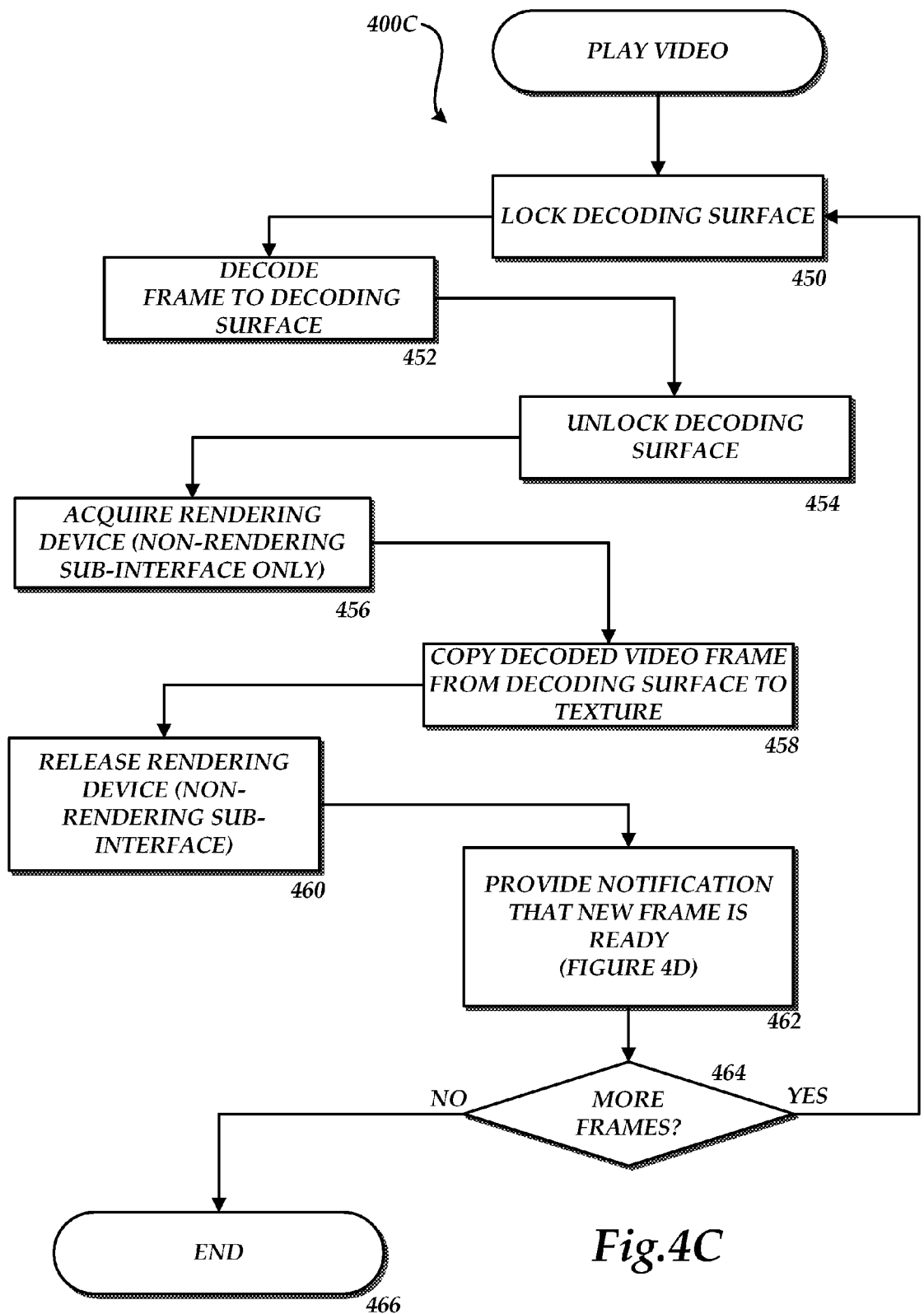

The routine 400C illustrated in FIG. 4C shows one illustrative process for playing back the frames of the video 112. The routine 400C begins at operation 450, where the thread 206 acquires and locks the decoding surface 204. The routine 440C then continues to operation 452 where the decoding sub-system 118 decodes a frame of the video 112 to the decoding surface 204. Once a frame of the video 112 has been decoded, the routine 400C proceeds to operation 454 where the decoding surface 204 is unlocked. The routine 400C then proceeds to operation 456.

At operation 456, the thread 314 acquires the rendering device 312. Once the rendering device 312 has been acquired, the routine 400C proceeds to operation 458, where the thread 314 copies the decoded frame from the decoding surface 204 to the texture 302. The routine 400C then proceeds to operation 460, where the thread 314 releases the rendering device 312. Once the rendering device 312 has been released, a notification is provided that a new frame is ready for rendering at operation 462. The new frame is rendered in the manner described below with respect to FIG. 4D.

From operation 462, the routine 400C proceeds to operation 464 where a determination is made as to whether additional frames of the video 112 remain to be rendered. If so, the routine 400C returns to the operation 450 discussed above. If no additional frames of the video 112 are to be rendered, or if a user has requested to stop playback, the routine 400C proceeds to operation 466, where it ends.

Figure 4D:
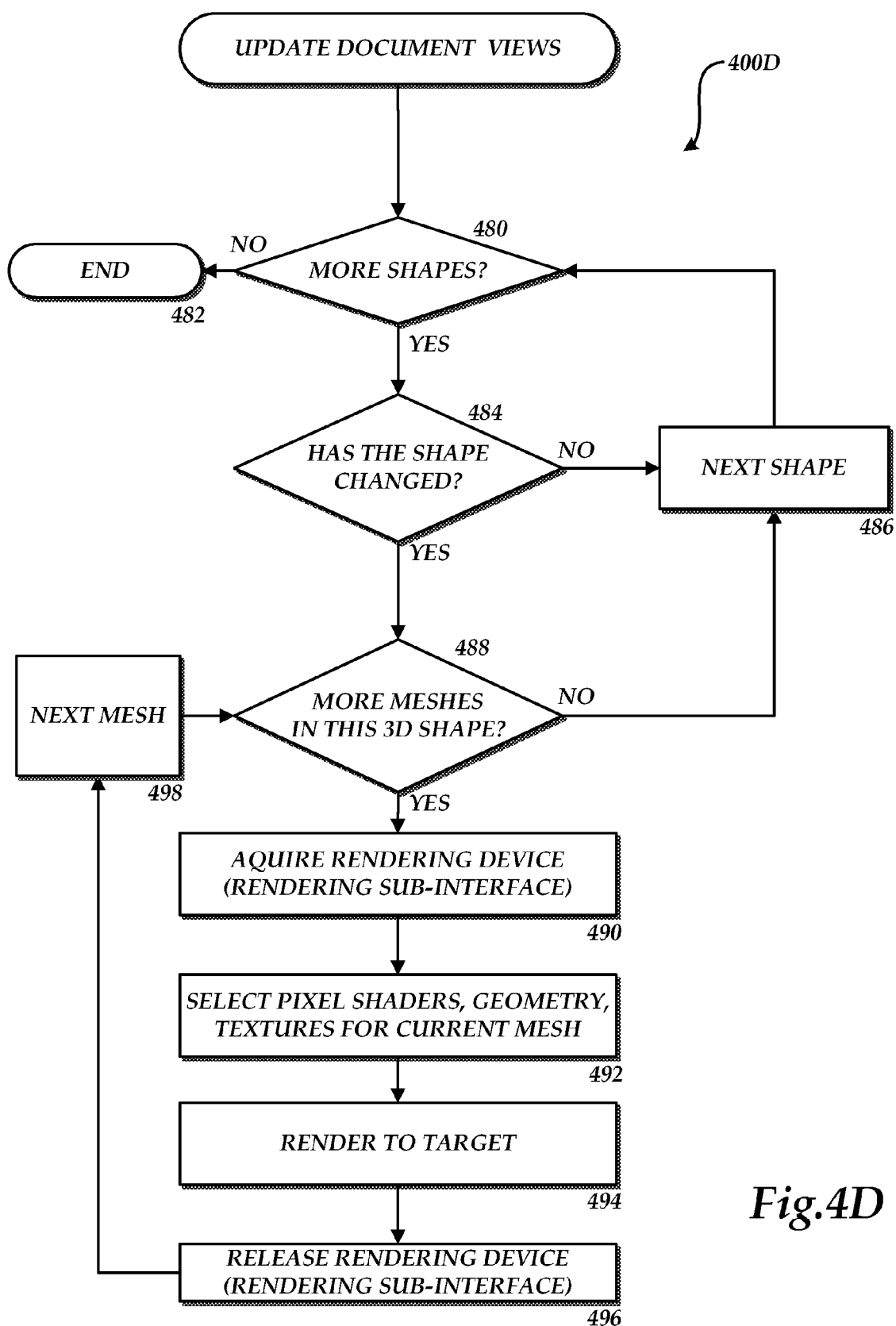

The routine 400D shown in FIG. 4D shows one illustrative process for updating a view of the document 104, including the rendering of a video contained therein. In particular, the routine 400D begins at operation 480 where a determination is made as to whether more shapes remain to be rendered. If not, the routine 400D proceeds to operation 482, where it ends. If additional shapes remain to be rendered in the document view, the routine 400D proceeds from operation 480 to operation 484.

At operation 484 a determination is made as to whether the current shape has changed since it was last rendered. If the shape has not changed, the routine 400D proceeds to operation 486, where the next shape is selected for rendering. If the current shape has changed since it was last rendered, the routine 400D proceeds from operation 484 to operation 488 where a determination is made as to whether additional meshes remain to be rendered for the current shape. If not, the routine 400D proceeds from operation 488 to operation 486, described above.

If additional meshes remain to be rendered at operation 488, the routine 400D proceeds to operation 490 where the rendering device is acquired. The routine 400D then proceeds to operation 492, where the pixel shaders 310, geometry 306, and textures 308 are selected for the current mesh. The routine 400D then proceeds to operation 494, where the current mesh is rendered by the 3D rendering sub-system 120 to the rendering target. As discussed above, the 3D rendering sub-system 120 utilizes the current geometry 306, the pixel shaders 310, and the pre-computed textures 308 to render the mesh.

Once rendering has been completed, the routine 400D proceeds to operation 496, where the rendering device 312 is released. The routine 400D then proceeds to operation 498 where a determination is made as to whether additional meshes remain to be rendered. If additional meshes remain to be rendered, the routine 400D proceeds from operation 488 to operation 490, described above. If no additional meshes remain to be rendered for the current shape, the routine 400D proceeds from operation 488 to operation 486, described above.

Figure 5:
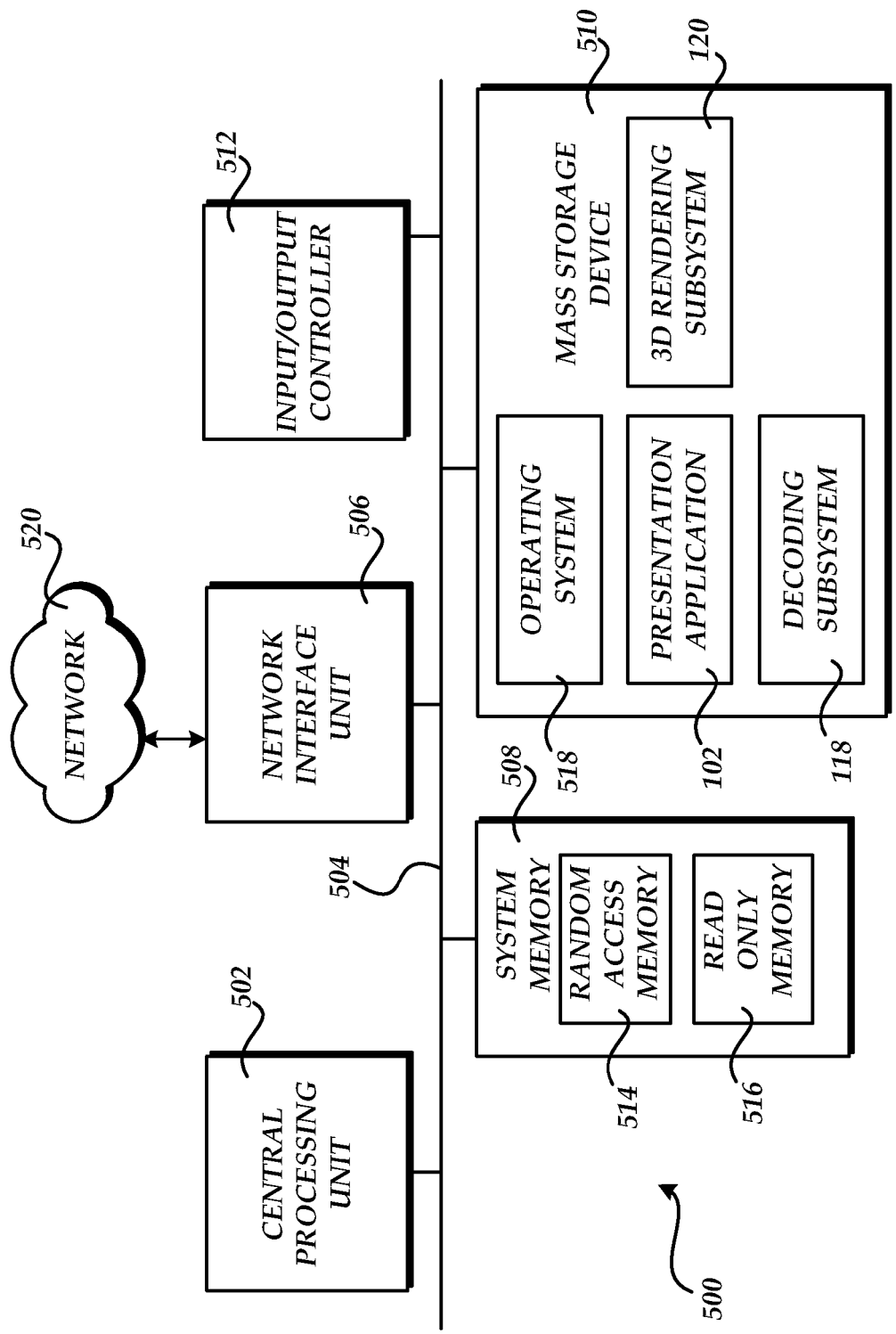
FIG. 5 is a computer architecture diagram showing an illustrative computer hardware and software architecture for a computing system capable of implementing aspects of the embodiments presented herein.

FIG. 5 shows an illustrative computer architecture for a computer 500 capable of executing the software components described herein for applying effects to a video in-place in a document in the manner presented above. The computer architecture shown in FIG. 5 illustrates a conventional desktop, laptop, or server computer and may be utilized to execute any aspects of the software components described above with respect to FIGS. 4A-4C.

The computer architecture shown in FIG. 5 includes a central processing unit 502 ("CPU"), a system memory 508, including a random access memory 514 ("RAM") and a read-only memory ("ROM") 516, and a system bus 504 that couples the memory to the CPU 502. A basic input/output system containing the basic routines that help to transfer information between elements within the computer 500, such as during startup, is stored in the ROM 516. The computer 500 further includes a mass storage device 510 for storing an operating system 518, application programs, and other program modules, which are described in greater detail herein.

The mass storage device 510 is connected to the CPU 502 through a mass storage controller (not shown) connected to the bus 504. The mass storage device 510 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available computer storage media that can be accessed by the computer 500.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network such as the network 520. The computer 500 may connect to the network 520 through a network interface unit 506 connected to the bus 504. It should be appreciated that the network interface unit 506 may also be utilized to connect to other types of networks and remote computer systems. The computer 500 may also include an input/output controller 512 for receiving and processing input from a number of other devices, including a keyboard, mouse, or electronic stylus (not shown in FIG. 5). Similarly, an input/output controller may provide output to a display screen, a printer, or other type of output device (also not shown in FIG. 5).

As mentioned briefly above, a number of program modules and data files may be stored in the mass storage device 510 and RAM 514 of the computer 500, including an operating system 518 suitable for controlling the operation of a networked desktop, laptop, or server computer. The mass storage device 510 and RAM 514 may also store one or more program modules. In particular, the mass storage device 510 and the RAM 514 may store the presentation application 102, the decoding sub-system 118, and the 3D rendering sub-system 120, each of which was described in detail above with respect to FIGS. 1-4. The mass storage device 510 and the RAM 514 may also store other types of program modules and data.

Based on the foregoing, it should be appreciated that technologies for applying effects to a video in-place in a document are provided herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for applying effects to a video in-place in a document on a computing system having a decoding sub-system and a three-dimensional (3D) rendering sub-system, the method comprising:

storing a document with a video embedded therein at the computing system, said document comprising non-video presentation objects and a plurality of slides that sequentially present the video and non-video presentation objects;

applying a theme to the document, the theme including a plurality of grouped properties that simultaneously each apply an effect configured to visually modify the video and non-video presentation objects in the document consistent with the theme;

receiving a request to play the video in-place in the document with an effect consistent with at least one property of the plurality of grouped properties of the theme applied to the video; and in response to the request,
configuring the decoding sub-system to decode a frame of the video and to copy the decoded frame to a decoding surface on a first thread,
configuring the 3D rendering sub-system to render the decoded frame with the effects applied thereto,
copying the decoded frame from the decoding surface to a texture on a second thread,
copying the texture to a rendering surface, and
instructing the 3D rendering sub-system to render the texture to a 3D shape with the effect consistent with at least one property of the plurality of grouped properties of the theme applied thereto, and displaying the rendered frames of the video in-place in the document, wherein the first thread is further configured to acquire the decoding surface prior to copying a decoded frame to the decoding surface and to release the decoding surface after the decoded frame has been copied to the decoding surface, and wherein the second thread is further configured to acquire the decoding surface prior to copying a decoded frame from the decoding surface to a texture and to release the decoding surface after the decoded frame has been copied from the decoding surface to the texture.

2. A computer storage device having computer executable instructions stored thereon which, when executed by a computer, cause the computer to:

create and store a document with a video embedded therein, said document comprising non-video presentation objects and a plurality of slides that sequentially present the video and non-video presentation objects;

apply a theme to the document, the theme including a plurality of grouped properties that simultaneously each apply an effect configured to visually modify the video and non-video presentation objects in the document consistent with the theme;

receive a request to play the video in-place in the stored document with one or more effects consistent with at least one property of the plurality of grouped properties of the theme applied to the video; and in response to the request, cause the computer to acquire a rendering device, to allocate a decoding surface and a rendering surface on the rendering device, and to release the rendering device, and to cause a decoding sub-system to decode frames of the video to produce decoded frames, to cause a three-dimensional (3D) rendering sub-system to
copy the decoded frame from the decoding surface to a texture on a second thread,
copy the texture to the rendering surface, and
to render the texture to a 3D shape with the one or more effects consistent with at least one property of the plurality of grouped properties of the theme applied thereto, and
to display the rendered frames of the video in-place in the document, wherein causing a decoding sub-system to decode frames of the video to produce decoded frames comprises configuring a decoding sub-system to decode a frame of the video and to copy the decoded frame to the decoding surface on a first thread, and comprising further computer-executable instructions which, when executed by the computer, cause the second thread to acquire the rendering device prior to copying a decoded frame from the decoding surface to a texture and to release the rendering device after the decoded frame has been copied from the decoding surface to the texture.

3. The computer storage device of claim 2, comprising further computer-executable instructions which, when executed by the computer, cause the first thread to acquire the rendering device prior to copying a decoded frame to the decoding surface and to release the rendering device after the decoded frame has been copied to the decoding surface.

4. The computer storage device of claim 3, wherein the effects comprise one or more color effects.

5. The computer storage device of claim 4, wherein configuring the 3D rendering sub-system to render the decoded frame with the effects applied thereto comprises creating one or more pixel shaders for implementing the color effects prior to receiving the request to play the video in-place in the document.

6. The computer storage device of claim 5, wherein one or more animations are applied to the video while the frames of the video are being decoded and rendered.

7. The computer storage device of claim 6, wherein the effects comprise one or more of a cropping effect, a reflection effect, or a border effect.

8. The computer storage device of claim 7, wherein the document comprises a presentation document and wherein the effects are defined by one or more properties.

9. A computing system for rendering a video in-place in a document with effects applied to the video, the computing system comprising:
 a decoding sub-system;
 a three-dimensional rendering sub-system; and
 a presentation application program executing on a processor in the computing system configured
  to store a presentation document with the video embedded therein, said document comprising non-video presentation objects and a plurality of slides that sequentially present the video and non-video presentation objects,
  to apply a theme to the document, the theme including a plurality of grouped properties that simultaneously each apply an effect configured to visually modify the video and non-video presentation objects in the document consistent with the theme,
  to receive a request to play the video in-place in the document with the effects consistent with at least one property of the plurality of grouped properties of the theme applied to the video, and in response to receiving the request,
  to configure a decoding sub-system to decode a frame of the video and to copy the decoded frame to a decoding surface on a first thread,
  to configure a 3D rendering sub-system to render the decoded frame with the effects consistent with at least one property of the plurality of grouped properties of the theme applied thereto,
  to copy the decoded frame from the decoding surface to a texture on a second thread,
  to copy the texture to a rendering surface, and
  to instruct the 3D rendering sub-system to render the texture to a 3D shape with the effects consistent with at least one property of the plurality of grouped properties of the theme applied thereto, and to display the rendered frames of the video in-place in the document,
 wherein the first thread is further configured to acquire the decoding surface prior to copying the decoded frame to the decoding surface and to release the decoding surface after the decoded frame has been copied to the decoding surface, and
 wherein the second thread is further configured to acquire the decoding surface prior to copying the decoded frame from the decoding surface to a texture and to release the decoding surface after the decoded frame has been copied from the decoding surface to the texture.

10. The system of claim 9, wherein the presentation application is further configured to apply one or more animations to the video while the frames of the video are being decoded and rendered.

11. The system of claim 10, wherein the effects comprise one or more of a color effect, a cropping effect, a reflection effect, or a border effect.

12. The system of claim 11, wherein configuring the 3D rendering sub-system to render the decoded frame with the effects applied thereto comprises creating a pixel shader for implementing the color effect prior to receiving the request to play the video in-place in the document.

* * * * *